United States Patent
Wallace et al.

(10) Patent No.: US 9,026,513 B2
(45) Date of Patent: *May 5, 2015

(54) ASSOCIATING DIGITAL IMAGES WITH WAYPOINTS

(71) Applicant: Apple Inc., Cupertino, CA (US)

(72) Inventors: Alexander David Wallace, Sunnyvale, CA (US); Tim Cherna, San Francisco, CA (US); Eric Hanson, Emerville, CA (US); Nikhil Bhatt, Cupertino, CA (US); Mark Lee Kawano, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,903

(22) Filed: Oct. 9, 2012

(65) Prior Publication Data
US 2013/0027427 A1   Jan. 31, 2013

Related U.S. Application Data

(63) Continuation of application No. 12/868,670, filed on Aug. 25, 2010, now Pat. No. 8,321,395.

(60) Provisional application No. 61/237,254, filed on Aug. 26, 2009.

(51) Int. Cl.
G06F 17/30    (2006.01)

(52) U.S. Cl.
CPC .... G06F 17/30241 (2013.01); G06F 17/30265 (2013.01)

(58) Field of Classification Search
CPC .................. G06F 17/30264; G06F 17/30244; G06F 17/30247
USPC .................................. 707/803–805, 915, 705
See application file for complete search history.

(56) References Cited

U.S. PATENT DOCUMENTS

2003/0122839 A1 *   7/2003   Matraszek et al. ............ 345/581
2005/0104976 A1     5/2005   Currans
(Continued)

OTHER PUBLICATIONS

Tsai, et al. "Extent: Inferring Image Metadata from Context and Content." Department of Electrical & Computer Engineering and Computer Science. UC Santa Barbara. IEEE 2005. 4 pages.
(Continued)

*Primary Examiner* — Thu-Nguyet Le
(74) *Attorney, Agent, or Firm* — Wong, Cabello, Lutsch, Rutherford & Brucculeri, LLP

(57) ABSTRACT

Methods and systems are disclosed for identifying waypoints. In one aspect, a method performed by an application executing on a computer system, includes receiving at least two sets of digital images including a first set of digital images for which image acquisition times are known and a second set of digital images for which image acquisition times and image acquisition locations are known. The method further includes overlaying waypoint identifiers over a map image. The waypoint identifiers correspond to geographical coordinates and to time acquisitions of one or more of the second set of images. Furthermore, the method includes receiving from a user associated with the application a waypoint selection of the overlaid waypoint identifiers and one or more image selections of the first set of images. In response to receiving the selections, the method includes associating the selected ones of the first set of images with the selected waypoint, and generating a trip-descriptor including the first set of images associated with the overlaid waypoint identifiers.

21 Claims, 9 Drawing Sheets

(56) References Cited

U.S. PATENT DOCUMENTS

| | | |
|---|---|---|
| 2008/0069449 A1 | 3/2008 | Cho et al. |
| 2009/0010491 A1* | 1/2009 | Ko et al. .................. 382/103 |
| 2009/0324058 A1 | 12/2009 | Sandage et al. |
| 2009/0327229 A1* | 12/2009 | O'Connor et al. ............. 707/3 |
| 2010/0284566 A1 | 11/2010 | Hisatomi |
| 2011/0052073 A1 | 3/2011 | Wallace et al. |
| 2011/0055283 A1 | 3/2011 | Wallace et al. |
| 2011/0055284 A1 | 3/2011 | Wallace |

OTHER PUBLICATIONS

Wang et al. Method and Apparatus for Geo-named Object Identification. IP.com Prior Art Database, IPCOM000134145D. Feb. 24, 2006. 8 pages.

* cited by examiner

ASSOCIATING DIGITAL IMAGES WITH WAYPOINTS

TECHNICAL FIELD

This subject matter is related to identifying waypoints and associating digital images with the identified waypoints.

BACKGROUND

A waypoint is a pair of geographical coordinates that identifies a unique geographical position, for example, a specific location on Earth. The geographical coordinates of a waypoint typically define a specific point of longitude and latitude. Optionally, geographical coordinates can include altitude. Multiple waypoints can be used to generate a track path of a trip taken in the past or a trip that is planned for the future.

For example, because a waypoint can represent a geographical position that was reached during a past trip, naming the waypoint can serve as a reminder about that specific location, events that occurred at that specific location, and/or about the overall trip.

SUMMARY

Techniques and systems are disclosed for identifying waypoints and associating digital imagery with those waypoints. These techniques can associate a first set of images with waypoints generated based on a second set of images.

In one aspect, a method performed by an application executing on a computer system, includes receiving at least two sets of digital images including a first set of digital images for which image acquisition times are known and a second set of digital images for which image acquisition times and image acquisition locations are known. The method further includes overlaying waypoint identifiers over a map image. The waypoint identifiers correspond to geographical coordinates and to time acquisitions of one or more of the second set of images. Furthermore, the method includes receiving from a user associated with the application a waypoint selection of the overlaid waypoint identifiers and one or more image selections of the first set of images. In response to receiving the selections, the method includes associating the selected ones of the first set of images with the selected waypoint, and generating a trip-descriptor including the first set of images associated with the overlaid waypoint identifiers.

These and other implementations can include one or more of the following features. The method can include displaying an index of the second set of images, receiving an image selection from the displayed index, and generating a waypoint based on geographical coordinates corresponding to the received image selection from the index. The method can further include associating with the generated waypoint an acquisition time and additional information corresponding to the received image selection from the index. Generating the trip-descriptor includes aggregating (i) the first set of images associated with the overlaid waypoint identifiers, and (ii) additional information associated with the overlaid waypoint identifiers into a trip-descriptor data structure on a storage device. Pointers to the trip-descriptor data structure can be stored in a data repository.

In some implementations, the method can include offsetting image acquisition times of the first set of images to match (i) an average acquisition time of the one or more image selections from the first set of images with (ii) the acquisition time corresponding to the waypoint selection. For each one of the first set of images, the method further includes associating one of the first set of images with an overlaid waypoint if the offset time acquisition of the one is different from a time acquisition corresponding to the overlaid waypoint by less than a predetermined time.

In some implementations, the method can include synthesizing a path based on the overlaid waypoint identifiers, matching the first set of images to the synthetic path, and adding to the trip-descriptor the first set of images matched to the synthetic path. Further, the method can include identifying a cluster of images from the first set of images taken near the synthetic path and not associated with the overlaid waypoint identifiers, and synthesizing a waypoint associated with the cluster of images.

The subject matter described in this specification can be implemented as a method or as a system or using computer program products, tangibly embodied in information carriers, such as a CD-ROM, a DVD-ROM, a HD-DVD-ROM, a Blue-Ray drive, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

These implementations may provide various advantages. For instance, the processes described in this specification can generate waypoints based on geographical coordinates of a set of images acquired using a camera- and Global Positioning Satellite (GPS)-enabled smart phone.

DETAILED DESCRIPTION

Techniques and systems are disclosed for identifying waypoints. These processes can be implemented at a digital computer for associating a first set of images with waypoints generated based on a second set of images.

The techniques and systems disclosed in this specification can be implemented in the APERTURE® software (available from Apple, of Cupertino, Calif.) for identifying waypoints.

Figure 1:
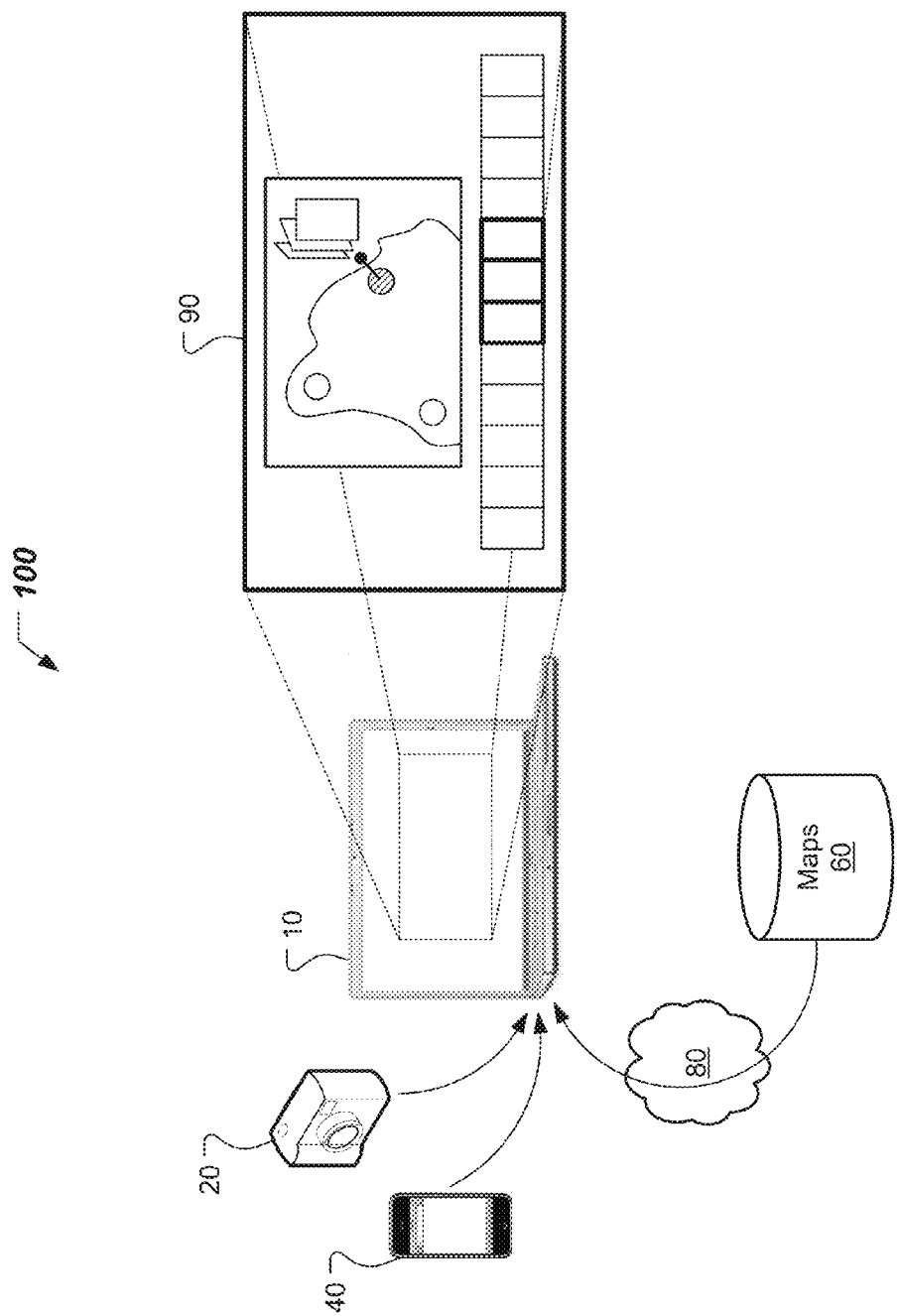
FIG. 1 shows a block diagram of an example system including a digital computer in communication with a digital camera, a mobile device and a storage device storing geocoded information.

FIG. 1 shows a block diagram of an example system including a digital computer 10 in communication with a digital camera 20, a mobile device 40 and a storage device storing geo-coded information 60.

The digital computer 10 can be a laptop computer, a workstation or a server computer. In some implementations, the digital camera 20, the mobile device 40 and the storage device storing geo-coded information 60 can be coupled to the digital computer 10 using a variety of known technologies (e.g., USB, FireWire®, RS 232). In other implementations, the connection between the digital computer 10 and the mobile device 40 can be implemented as a wired or wireless network connection.

The mobile device 40 can be configured as a GPS tracking device. A location interface, such as a Global Positioning System (GPS) processor, also can be included in the mobile device 40 to provide location information, e.g., an indication of current location. In some implementations, a general or a special purpose processor included in the mobile device 40 can be configured to perform location estimation, such as through base station triangulation. Further, the mobile device 40 can be configured as a mobile telephone that can establish a cellular (e.g., 3G or 4G) network connection that provides data access to the communication network 80 and/or a cell phone communication network. Furthermore, the mobile device 40 can be configured as a digital camera. The mobile device can include a storage device for storing, among other things, digital images acquired with the mobile device configured as a digital camera.

However, the user may prefer using the digital camera 20 to using the mobile device configured as a digital camera, e.g., for taking images during road trips, hikes, bike trips, etc. Reasons for such a preference may be, e.g., a higher resolution charge-coupled device (CCD) array, a lens having focal distance of interest and/or an acquisition angle of interest (e.g., wide angle), all advantages in favor of the digital camera 20.

The storage device storing geo-coded information 60 can be located remotely from the digital computer 10 and be operated by a network-based provider of geo-coded information. In such implementations, the digital computer can communicate with the storage device 60 via a communication network 80, e.g., the internet. The connection between the digital computer 10 and the network-based storage device 60 can be implemented as a wired or wireless network connection.

A software interface 90 of an application running on the digital computer 10 is configured to display inputs received from the digital camera 20, the mobile device 40 and the storage device storing geo-coded information 60. In some implementations, the foregoing inputs may be received automatically, e.g., upon establishing a connection with the digital camera 20 and/or the mobile device 40. In other implementations, the software interface 90 may be configured to receive instructions entered by the user. Such user instructions may be for requesting inputs from the connected digital camera 20 and/or GPS tracker device 40, and/or from the storage device storing geo-coded information 60. Other instructions entered by the user to the software interface 90 may be for selecting one or more of the displayed inputs (previously received from the connected devices). Finally, the software interface 90 can be configured to display outputs of the application implemented on the digital computer 10 for processing the inputs from the digital camera 20, the mobile device 40 and the storage device storing geo-coded information 60. An example of such application can be implemented on system 100 as described in reference to FIG. 2.

Figure 2:
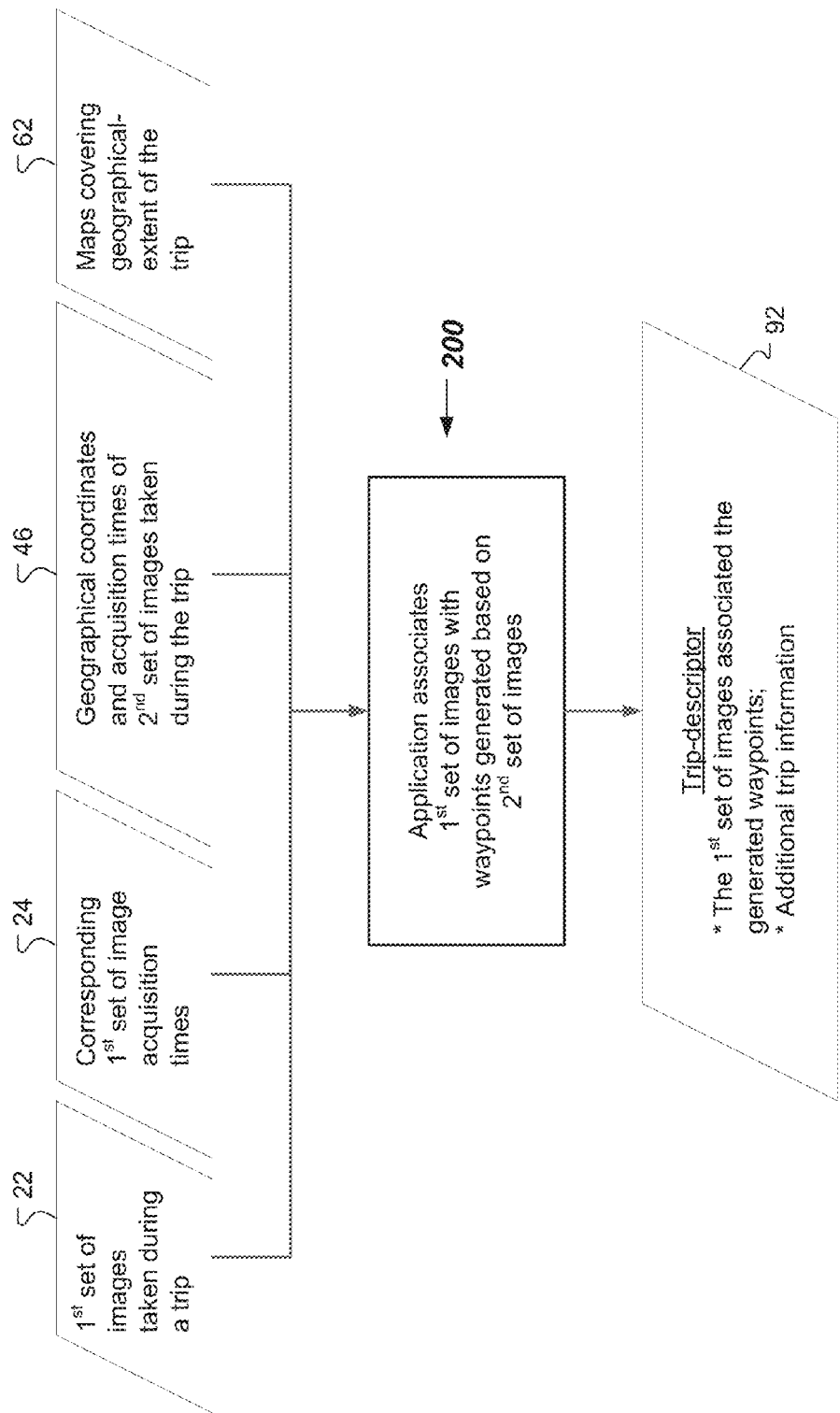
FIG. 2 shows a block diagram of an example process implemented at a digital computer for associating $1^{st}$ set of images with waypoints generated based on $2^{nd}$ set of images.

FIG. 2 shows a transfer-function diagram of an example process implemented at a digital computer for associating $1^{st}$ set of images 22 with waypoints generated based on $2^{nd}$ set of images.

The process 200 receives, from the digital camera 10, a first set of images 22 taken during a trip. The first set of images 22 may also be received from a storage device communicatively coupled to the digital computer 10.

The process 200 also receives a corresponding first set of image acquisition times 24. In some implementations, the corresponding first set of image acquisition times 24 can be received from the digital camera 20, in the form of metadata associated with the first set of images 22. In such cases, the first set of acquisition times 24 may be shifted by a time offset, e.g., with respect to a local standard time at the start of the trip. In other implementations, when the first set of images 22 is received from the digital camera 20 without the corresponding first set of image acquisition times 24, the user may manually input the corresponding first set of acquisition times 24. For example, for each one of the first set of images 22, the user can type a corresponding acquisition time from notes taken during the trip. In another example, the user may import the corresponding first set of image acquisition times 24 from a spreadsheet filled during the trip.

The process 200 receives a data relating to a second set of images 46 taken during the trip 42, from the mobile device 40. The data relating to a second set of images 46 may also be received from a storage device communicatively coupled to the digital computer 10. The data includes geographical coordinates and an acquisition time for each one of the second set of images 46.

The process 200 receives, from a storage device storing geo-coded information 60, maps 62 covering the geographical-extent of the trip.

An application, implemented on the digital computer 10 and configured to receive inputs 22, 24, 46 and 62 relating to a trip, can use process 200 to associate the first set of images 22, taken during a trip, with waypoints generated based on data relating to the second set of pictures 64. The first set of images 22 associated with the generated waypoints can be packaged and stored in the form of a trip-descriptor 92. The trip-descriptor 92 can include the set of images 22 matched to the generated waypoints. The trip-descriptor 92 can further include additional trip information. These and other elements of the trip-descriptor 92 are disclosed later in this specification.

Figure 3A:
FIGS. 3A-3C are block diagrams showing aspects of an example implementation of a process for associating $1^{st}$ set of images with waypoints generated based on $2^{nd}$ set of images.
Figure 3B:
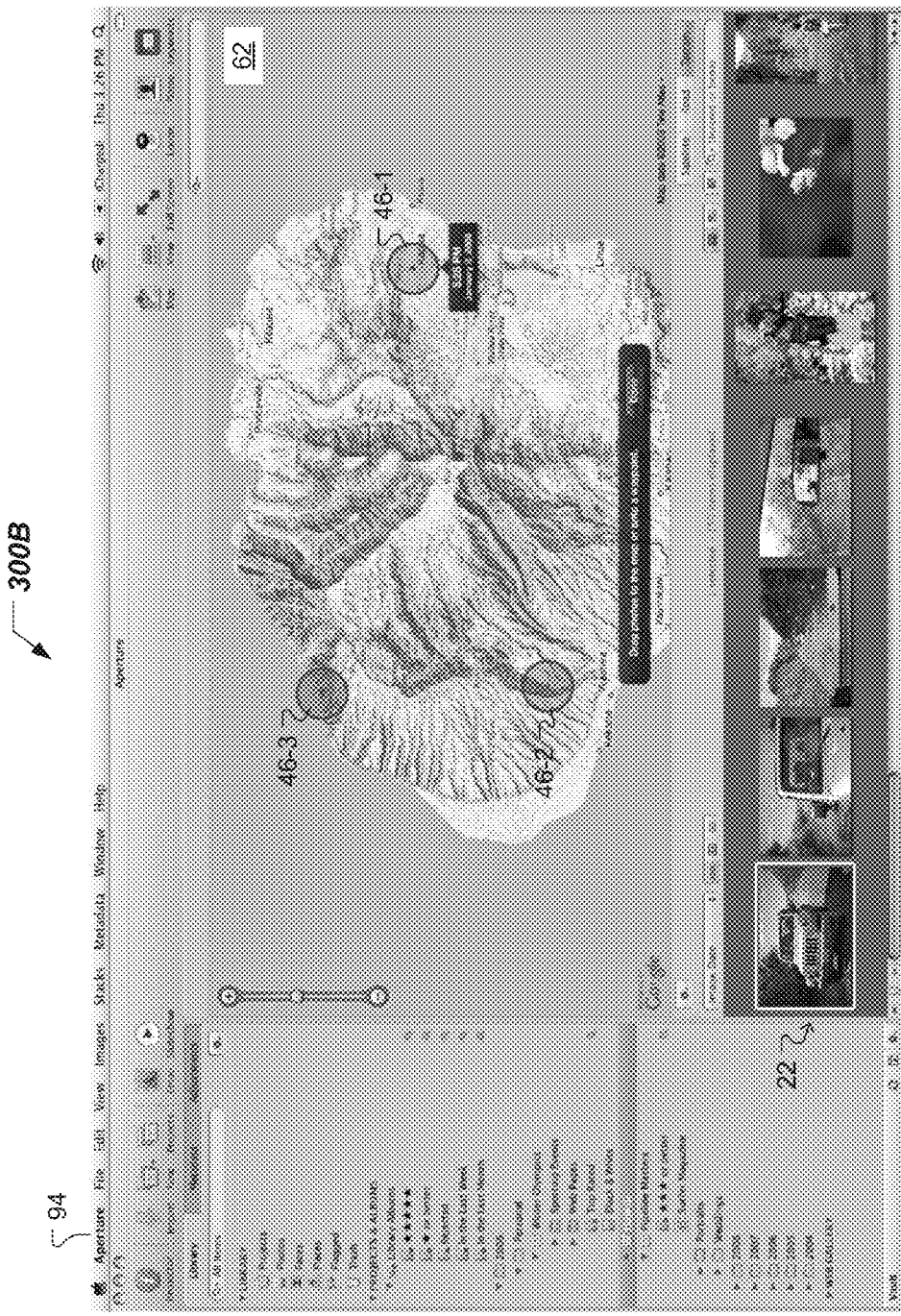
Figure 3C:
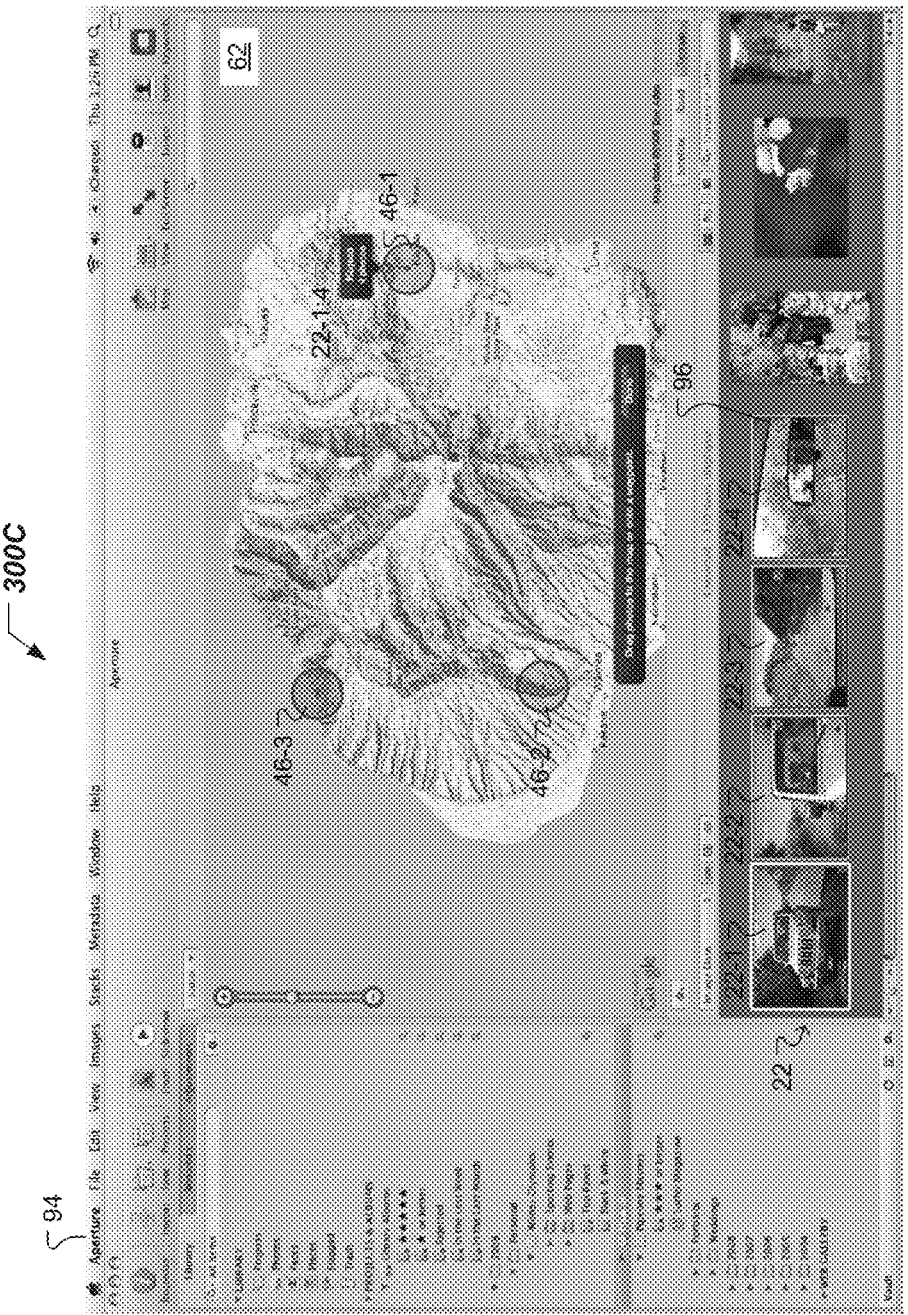

FIGS. 3A-3C are block diagrams showing aspects of an example implementation of a process for associating a first set of images with waypoints generated based on a second set of images. The process implemented in FIGS. 3A-3C may be process 200 described above, regarding FIG. 2.

The example implementation illustrated in FIGS. 3A-3C refers to the following example off-roading trip in Hawaii. A tourist and his party rides in an off-road vehicle around the Kauai Island. During the off-roading trip, the tourist takes high resolution pictures using a digital camera 20. The high resolution pictures can be the first set of pictures 22. In this example trip, each high resolution picture is marked with the acquisition time, based on a clock located on the digital camera. Thus, the first set of acquisition times 24 can be delivered together with the first set of pictures 22. Additionally, at various locations along the trip, the tourist takes photos using a mobile device 40 configured as a cellular telephone, GPS tracking device and digital camera. The pictures taken using the mobile device 40 can be the second set of pictures 44. The second set of pictures 44 is stored on a store of the mobile device 40. Each of the second set of pictures 44 is marked with the geographical coordinates of an acquisition location and acquisition time. At a location, the tourist took multiple pictures included in the first set of pictures 22 and one picture included in the second set of pictures 44. At another location, the tourist took one or more pictures included in the first set of pictures 22 and took no picture using the mobile device 40. At some other location, the tourist took no pictures using the digital camera 20, but took a picture included in the second set of pictures 40. Upon returning from vacation, the tourist can use the system and processes described in this specification, e.g., process 200 in combination with system 100, for associating the first set of pictures 22 with waypoints generated based on the second set of pictures 44.

FIG. 3A shows a portion of a screenshot 300A, as displayed to the user by the digital computer 10, illustrating the first set of pictures 22 received from the digital camera 20. The high resolution pictures are identified as 22-1, 22-2, . . . . In some implementations, an application interface 94 displays to the user an index 42 of the second set of pictures 44. The user can select one or more, e.g., 44-1, 44-2 and 44-3, from the second set of pictures. By having the user select from the second set of pictures 44, instead of, e.g., automatically selecting the entire second set of pictures 44, the process avoids importing data relating to potentially old and/or irrelevant pictures stored on the mobile device 40. In other implementations, the process may automatically import, from the mobile device 40, data relating to the appropriate ones of the second set of pictures 44.

Once an image selection 44-1:3 from the displayed index 42 is received, from the user, the process retrieves, from the mobile device 40, data relating to the selected ones from the second set of images 44 taken during the trip. The data includes geographical coordinates and an acquisition time for each selected one of the second set of pictures 44. In some implementations, the selected ones of the second set of pictures 44 may not be imported by the digital computer 10. In other implementations, the selected ones of the second set of pictures 44 may be imported by the digital computer 10.

The process uses the geographical coordinates and an acquisition time for a selected one of the second set of pictures 44 to generate a waypoint 46. The generated waypoint 46 has the geographical coordinates and a corresponding time of the selected one of the second set of pictures 44. In the example illustrated in FIG. 3A, the process generates three waypoints, 46-1:3, corresponding to the acquisition location and time of the selected ones, 44-1:3, of the second set of pictures 44. In addition to the geographical coordinates and the acquisition time of a selected one of the second set of pictures 44, the process can also retrieve additional information relating to the selected one of the second set of pictures 44. For example, such additional information may include environmental information (e.g., temperature and atmospheric pressure at the acquisition location and time), sounds recorded during the picture acquisition, a dictated or written caption, etc. The process partially or entirely associates the retrieved additional information relating to the selected one of the second set of pictures 44 with the generated waypoint 46.

FIG. 3B shows a portion of a screenshot 300B, as displayed to the user by the digital computer 10, after generating the waypoints 46-1:3 corresponding to geographical coordinates and acquisition times of the selected ones 44-1:3 of the second set of pictures 44, respectively. The screenshot 300B illustrates the first set of pictures 22, and the waypoints 46-1:3 overlaid on a map 62 received from the storage device storing geo-coded information 60. For example, a default map scale can be such that the rectangle formed by the retrieved map 62 can overlap the generated waypoints 66. The map 62 can be a street map, a satellite map or a hybrid map.

The user can select one or more of the first set of pictures 22 and can also select an overlaid waypoint corresponding to the selected one or more pictures. For example, the user can select pictures 22-1:4 and can select the waypoint 46-1. In response to receiving the user's selections, the process can associate the selected one or more pictures with the selected waypoint. In some implementations, the user can select an overlaid waypoint, say 46-1, by clicking the waypoint marker. In other implementations, the user can select an overlaid waypoint, say 46-1, by dragging one or more selected pictures onto the waypoint marker.

FIG. 3C shows a portion of a screenshot 300C, as displayed to the user by the digital computer 10, after receiving from the user, the one or more selections of the first set of pictures 22 and the waypoint selection. The screenshot 300C illustrates the set of pictures 22 including the selected pictures 22-1:4, and overlaid waypoints 46-1:3. In some implementations, upon selection of, e.g., waypoint 46-1, the process can have the map 62 centered to and zoomed onto the waypoint 46-1.

In other implementations, the user can select one or more of the first set of pictures 22 prior to selecting an overlaid waypoint corresponding to the one or more selected ones of the first set of pictures 22. For example, the user can select pictures 22-1:4 (all 4 pictures) taken near the location of waypoint 46-1 and can select the waypoint 46-1. In this implementation, in response to receiving the users selections, the process can associate the one or more selected pictures with the selected waypoint. In response to the received selections, the process can associate the selected ones of the first set of pictures 22 with the selected waypoint. In some implementations, the user can continue to associate selected ones from the first set of pictures 22 with another selected one of the overlaid waypoints. Such manual associating can continue until all the entire first set of pictures 22 has been associated with the overlaid waypoints 46. It should be noted that the associating can be performed in various ways depending, for example, on a number or a geographical density of the overlaid waypoints 46. A way to perform the associating of the first set of pictures 22 with the overlaid waypoints 46 is described in reference to FIG. 5.

In some implementations, screenshot 300C can also indicate an associated waypoint for each one of the first set of pictures 22. For example, picture 22-4 can be tagged by a marker 96 corresponding to the associated waypoint 46-1. In other implementations, each overlaid waypoint 46 can be tagged by markers denoting the associated ones of the first set of pictures 22. For example, waypoint 46-1 can be tagged by a marker reading "22-1:4" to identify the associated pictures 22-1, 22-2, 22-3 and 22-4.

Finally, as described in FIG. 2, the process generates a trip-descriptor 92 to include the first set of pictures 22 associated with the overlaid waypoints 46 and additional trip information.

Once generated, the trip-descriptor 92 can be stored for future use. For example, the first set of pictures 22 associated with the overlaid waypoints 46 can be saved on a storage device communicatively coupled to the digital computer 10. Further, the additional trip information and pointers to the stored set of images can be stored as searchable data in a relational database. The searchable database can be available locally on the digital computer 10. Alternatively or additionally, the searchable database can also be hosted online, remote from the digital computer 10.

Figure 4:
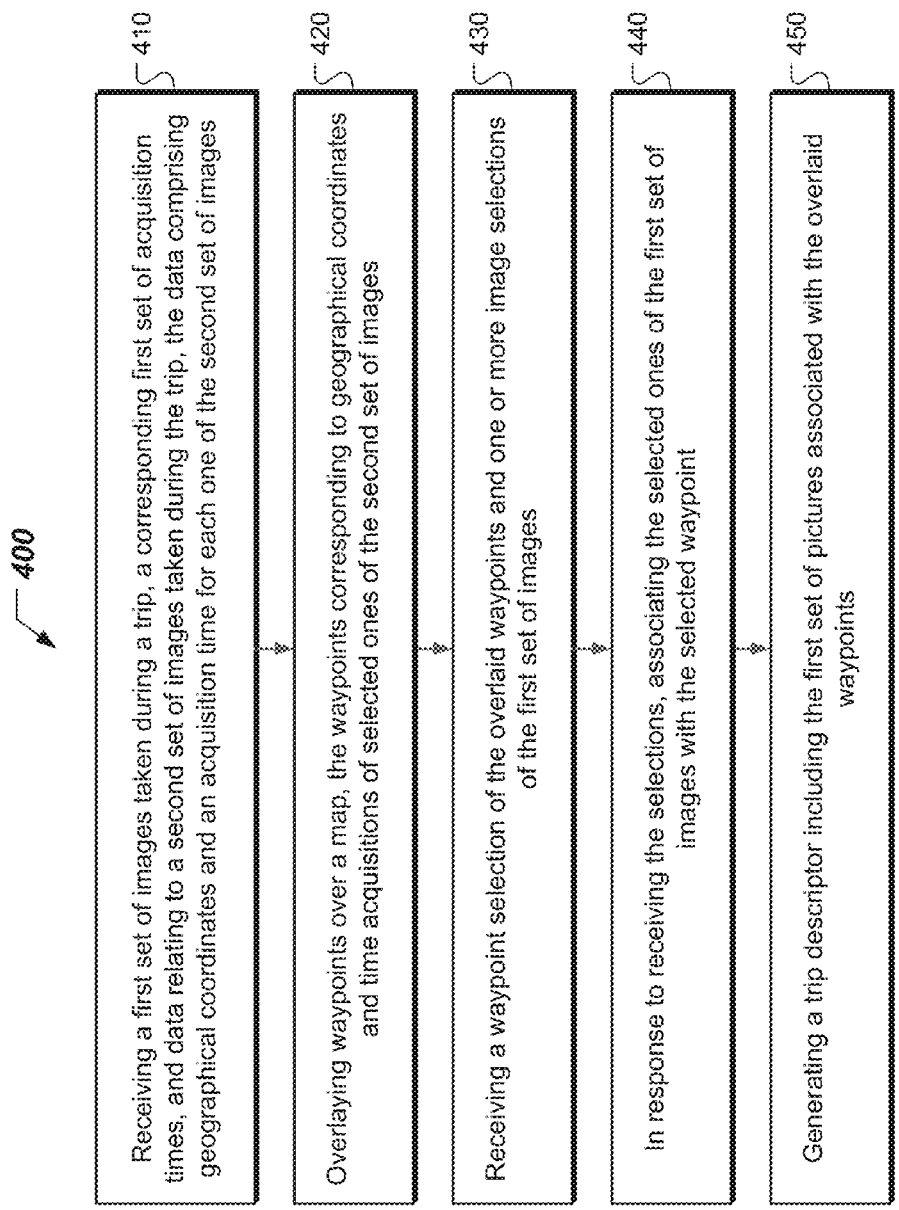
FIG. 4 shows a flow diagram of an example process for associating $1^{st}$ set of images with waypoints generated based on $2^{nd}$ set of images.

FIG. 4 shows a flow diagram of an example process for associating a first set of images with waypoints generated based on a second set of images. In some implementations, process 400 is performed at a digital computer, and begins when receiving 410, from a digital camera, a first set of images taken during a trip, and a corresponding first set of acquisition times, and further receiving, from a mobile device, data relating to a second set of images taken during the trip. The data includes geographical coordinates and an acquisition time for each one of the second set of images. Next, waypoints are overlaid 420 over a map. The waypoints correspond to geographical coordinates and time acquisitions of selected ones of the second set of images. A waypoint selection of the overlaid waypoints and one or more image selections of the first set of images are received 430 from a user. In response to receiving the selections, the selected ones of the first set of images are associated 440 with the selected waypoint. A trip-descriptor including the first set of pictures associated with the overlaid waypoints is generated 450.

Figure 5:
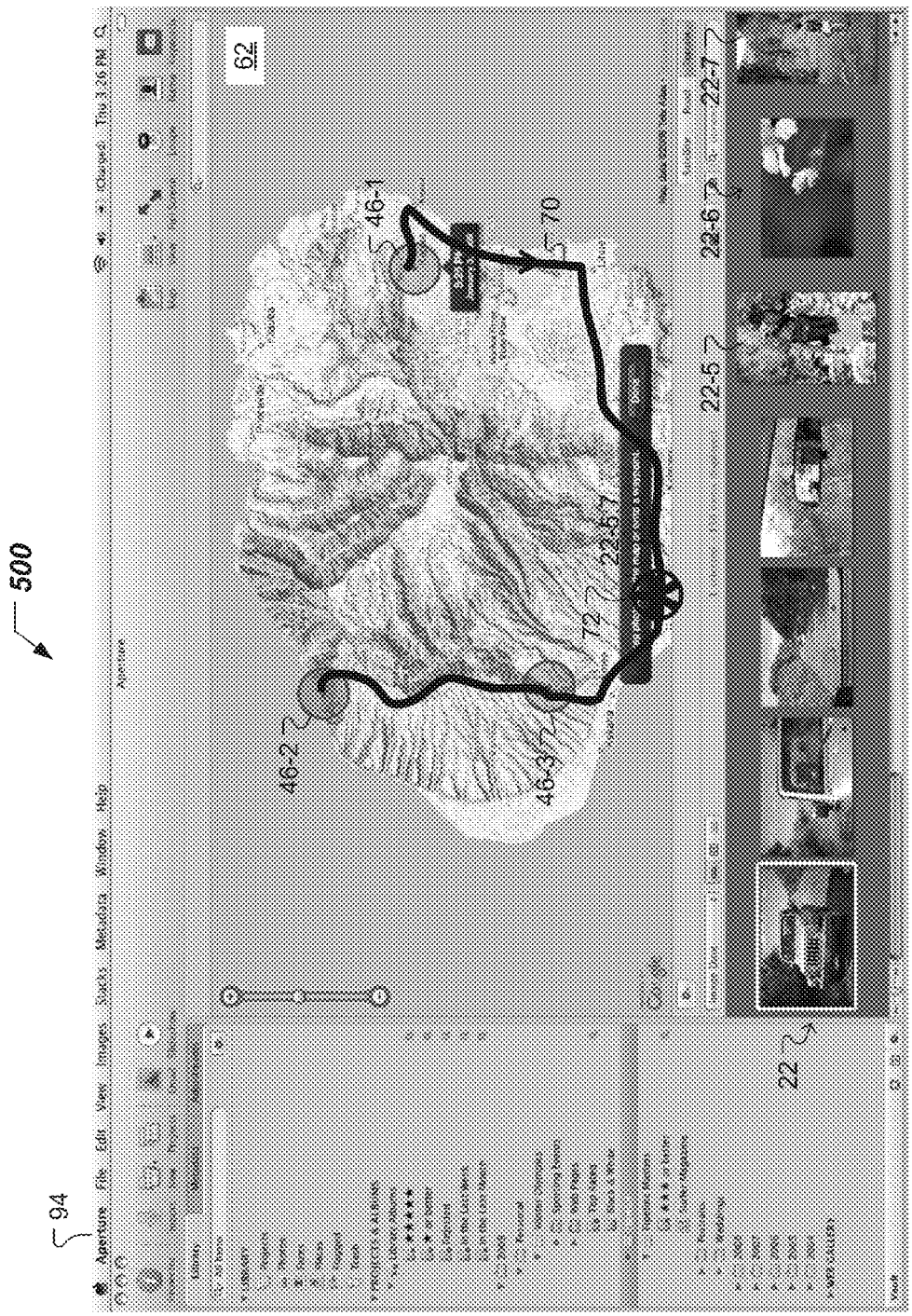
FIG. 5 shows aspects of an example implementation of a process for automatically associating a set of pictures with a set of waypoints.

FIG. 5 shows aspects of an example implementation of a process for automatically associating ones of the first set of pictures with the overlaid waypoints 46. The associating 500 described in FIG. 5 can be implemented in the process disclosed above in reference to FIGS. 3A-3C, and/or in reference to FIG. 4. Further, the example trip discussed in reference to FIGS. 3A-3C is also used in FIG. 5.

The process can offset the first set of acquisition times 24 to match (i) an average acquisition time of the selected one or more of the first set of pictures 22 to (ii) the time corresponding to the selected waypoint. For example, the time corresponding to waypoint 46-1 is compared to the average acquisition time of pictures 22-1:4 associated with the waypoint 46-1. The difference in time resulting from this comparison may be used to offset or shift the first set of acquisition times 24. Next, for each one of the first set of images 22, the process can associate one of the first set of images 22 with an overlaid waypoint if the offset time acquisition of the one is different from a time corresponding to the overlaid waypoint by less then a predetermined time.

The ones of the first set of pictures 22 that cannot be associated with the overlaid waypoints by the process described above may have been acquired at locations different from the overlaid waypoints 46. Note that the tourist also took pictures with the digital camera 20 at locations where he did not take pictures with the mobile device 40.

Figure 6:
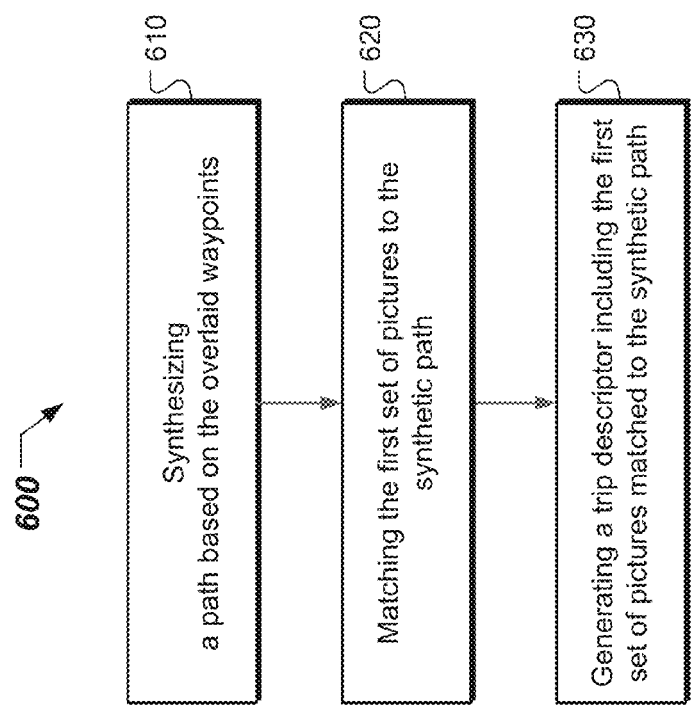
FIG. 6 shows a flow diagram of an example process for matching a first set of images to a synthetic track path of a trip.

In some implementations, the yet-to-be associated ones from the first set of images 22 may be associated with points along a synthetic track path of the trip. FIG. 6 shows a flow diagram of an example process 600 for matching the first set of images 22 to a synthetic track path of the trip.

A track path is synthesized 610 based on the overlaid waypoints 46. It should be noted that a track path can be synthesized based on interpolating the overlaid waypoints 46 under the constraint of existing roads or other access-ways in a geographical area between neighboring waypoints.

The first set of images 22 are matched 620 to the synthetic track path. It should be noted that matching a set of images (the first set of images 22) to a track path (the synthetic track path) can be performed as described in FIG. 5 of the P7890 application draft.

The first set of images matched to the synthetic track path can be added 630 to the trip-descriptor.

Returning to FIG. 5, the first set of images 22 matched to the synthetic track path 70 can be used to generate additional synthetic waypoints. The process can identify a cluster of ones, 22-5:7, of the first set of images taken near the synthetic track path 70 but not associated with the overlaid waypoints 46. The process can synthesize a waypoint 72 associated with the cluster of images 22-5:7.

Figure 7:
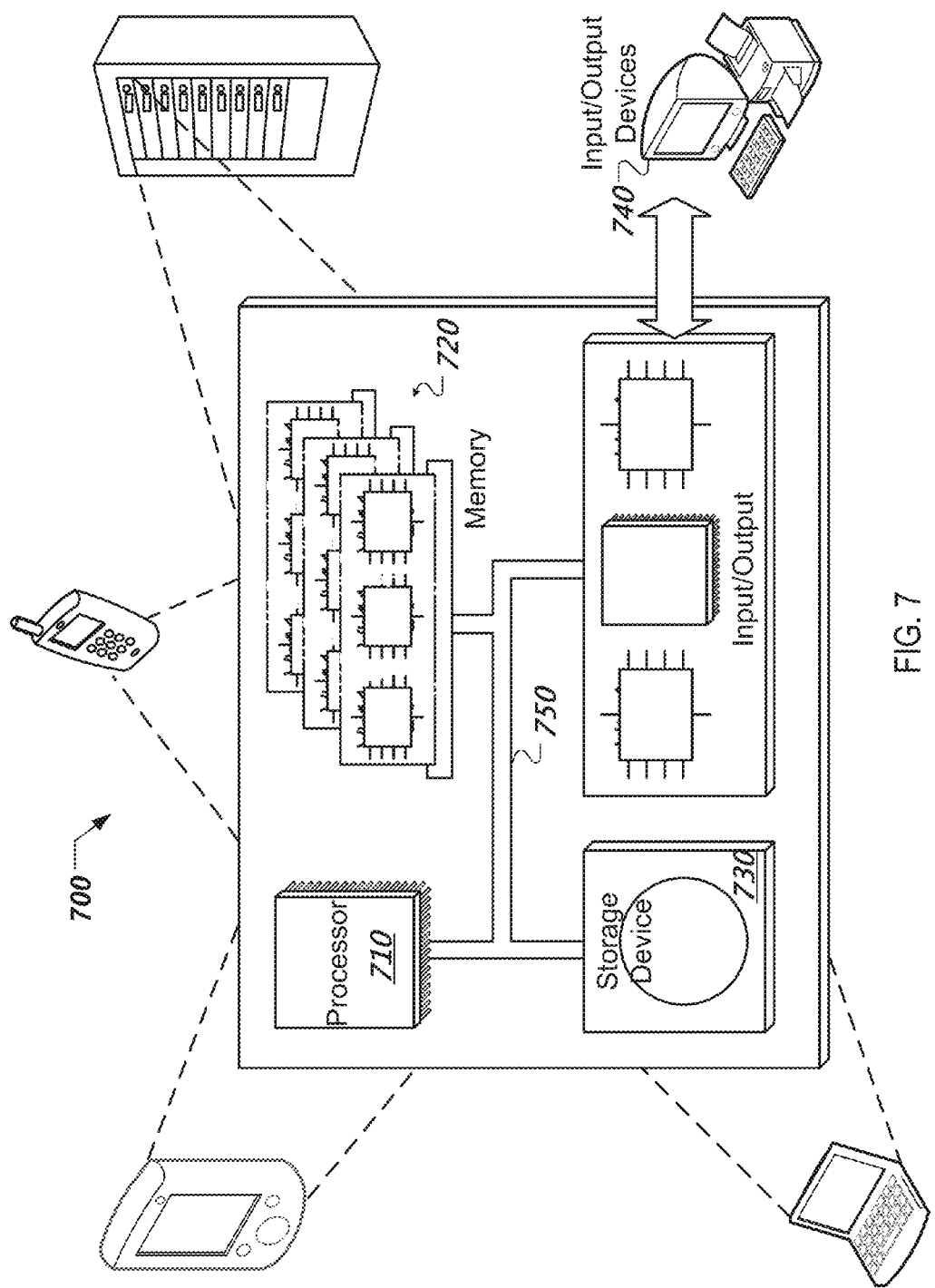
FIG. 7 shows a schematic of a computer system representing various forms of digital computers.

FIG. 7 shows a schematic diagram of a computer system 700 representing the digital computer 10. Also the computer system 700 can represent a storage computer storing geocoded information 60. The system 700 can be used for the operations described in association with any of the computer-implement methods described previously, according to one implementation. The system 700 is intended to include various forms of digital computers, such as laptops, desktops, workstations, servers, blade servers, mainframes, and other appropriate computers. The system 700 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

Aspects of the subject matter and the functional operations described in this specification can be implemented in digital electronic circuitry, or in computer software, firmware, or hardware, including the structures disclosed in this specification and their structural equivalents, or in combinations of one or more of them. Aspects of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal, that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, a portable electronic device, a server, or multiple processors, portable electronic devices and servers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a focal area network ("LAN") and a wide area network (WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular implementations of particular aspects. Certain features that are described in this specification in the context of separate aspects can also be implemented in combination in a single aspect. Conversely, various features that are described in the context of a single aspect can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A non-transitory program storage device, readable by a processor and comprising instructions stored thereon to cause one or more processors to:
   receive a first set of digital images, each image of which has a known acquisition time;
   receive a second set of digital images, each image of which has a known acquisition time and a known acquisition location, wherein the second set of digital images is associated with a trip;
   automatically overlay, onto a map image, a set of first waypoint identifiers, each waypoint identifier based on the known acquisition locations of one or more images in the second set of digital images, wherein the waypoint identifiers are selectable markers that provide a visual representation of the trip;
   receive a first indication of a selection of a first waypoint identifier;
   receive a second indication of a selection of one or more images from the first set of images;

associate the selected one or more images from the first set of images with the first waypoint identifier based, at least in part, on the first and second received indications; and associate images associated with the first waypoint identifier with a trip-descriptor, wherein the trip-descriptor comprises data that relates to the trip.

2. The non-transitory program storage device of claim 1, further comprising instructions to cause the one or more processors to:

display an index of two or more of the second set of images;

receive a third indication of a selection of one or more images from the index of two or more images of the second set of images; and generate a second waypoint identifier based, at least in part, on known acquisition location information of the one or more images from the index identified by the third indication.

3. The non-transitory program storage device of claim 1, wherein the instructions to cause the one or more processors to associate images associated with the first waypoint identifier with a trip-descriptor comprise instructions to cause the one or more processors to:

aggregate (i) the first set of images associated with the first waypoint identifier and (ii) additional information associated with the first waypoint identifier into a trip-descriptor data structure; and store the trip-descriptor data structure on a non-transitory storage medium.

4. The non-transitory program storage device of claim 3, wherein the instructions to cause the one or more processors to associate images associated with the first waypoint identifier with a trip-descriptor comprise instructions to cause the one or more processors to store pointers to the trip-descriptor data structure in a relational database.

5. The non-transitory program storage device of claim 1, further comprising instructions to cause the one or more processors to:

determine an offset time based, at least in part, on a known acquisition time associated with the first waypoint identifier and an average acquisition time for the one or more images from the first set of images associated with the first waypoint identifier; and offset the known acquisition time of each of the one or more images from the first set of images associated with the first waypoint identifier by an amount equal to the offset time.

6. The non-transitory program storage device of claim 5, further comprising instructions to cause the one or more processors to associate each of the one or more images from the first set of images with the first waypoint identifier if its offset time is different than the first waypoint identifier's known acquisition time by less than a predetermined value.

7. The non-transitory program storage device of claim 6, wherein the instructions to cause the one or more processors to associate images associated with the first waypoint identifier with a trip-descriptor further comprise instructions to cause the one or more processors to add the one or more images from the first set of images whose offset time is different than the first waypoint identifier's known acquisition time by less than the predetermined value to the trip-descriptor.

8. The non-transitory program storage device of claim 1, further comprising instructions to cause the one or more processors to:

synthesize a first path based on the first waypoint identifier and a second waypoint identifier;

match one or more images from the first set of images to the first synthesized path; and add the matched one or more images from the first set of images to the first synthesized path.

9. The non-transitory program storage device of claim 8, wherein the instructions to cause the one or more processors to associate images associated with the first waypoint identifier with a trip-descriptor further comprise instructions to cause the one or more processors to add the one or more images from the first set of images matched to the first synthesized path to the trip-descriptor.

10. The non-transitory program storage device of claim 8, further comprising instructions to cause the one or more processors to:

identify a cluster of one or more images from the first set of images taken near the first synthesized path and not associated with the first and second waypoint identifiers;

automatically overlay onto the map a third waypoint identifier associated with the identified cluster of images.

11. The non-transitory program storage device of claim 10, wherein the instructions to cause the one or more processors to associate images associated with the first waypoint identifier with a trip-descriptor further comprise instructions to cause the one or more processors to add the identified cluster of images to the trip-descriptor.

12. A method for associating digital images with waypoints, comprising:

receiving a first set of digital images, each image of which has a known acquisition time;

receiving a second set of digital images, each image of which has a known acquisition time and a known acquisition location, and wherein the second set of digital images is associated with a trip;

automatically overlaying, onto a map image, a set of waypoint identifiers, each waypoint identifier based on the known acquisition location of one or more images in the second set of digital images, wherein the waypoint identifiers are selectable markers that provide a visual representation of the trip;

receiving a first indication of a selection of a first waypoint identifier;

receiving a second indication of a selection of one or more images from the first set of images;

associating the selected one or more images from the first set of images with the first waypoint identifier based, at least in part, on the first and second received indications; and associating images associated with the first waypoint identifier with a trip-descriptor, wherein the trip descriptor comprises data that relates to the trip.

13. The method of claim 12, further comprising:

aggregating (i) the first set of images associated with the first waypoint identifier and (ii) additional information associated with the first waypoint identifier into a trip-descriptor data structure; and storing the trip-descriptor data structure on a non-transitory storage medium.

14. The method of claim 13, further comprising storing pointers to the trip-descriptor data structure in a relational database.

15. The method of claim 12, further comprising:

determining an offset time based, at least in part, on a known acquisition time associated with the first waypoint identifier and an average acquisition time for the one or more images from the first set of images associated with the first waypoint identifier; and offsetting the known acquisition time of each of the one or more images from the first set of images associated with the first waypoint identifier by an amount equal to the offset time.

16. The method of claim 15, further comprising associating each of the one or more images from the first set of images with the first waypoint identifier if its offset time is different than the first waypoint identifier's known acquisition time by less than a predetermined value.

17. The method of claim 16, further comprising adding the one or more images from the first set of images whose offset time is different than the first waypoint identifier's known acquisition time by less than the predetermined value to the trip-descriptor.

18. The method of claim 12, further comprising:
synthesizing a first path based on the first waypoint identifier and a second waypoint identifier;
matching one or more images from the first set of images to the first synthesized path; and
adding the matched one or more images from the first set of images to the first synthesized path.

19. The method of claim 18, further comprising adding the one or more images from the first set of images matched to the first synthesized path to the trip-descriptor.

20. The method of claim 18, further comprising:
identifying a cluster of one or more images from the first set of images taken near the first synthesized path and not associated with the first and second waypoint identifiers; and
automatically overlaying onto the map a third waypoint identifier associated with the identified cluster of images.

21. The method of claim 20, further comprising adding the identified cluster of images to the trip-descriptor.

* * * * *